L. STRAYER.
Mill-Burr Dress.

No. 218,793.          Patented Aug. 19, 1879.

Witnesses:
T. Walter Fowler.
R. K. Evans.

Inventor:
Lewis Strayer
by his attys.
A. H. Evans & Co.

UNITED STATES PATENT OFFICE.

LEWIS STRAYER, OF YORK, PENNSYLVANIA.

IMPROVEMENT IN MILL-BURR DRESSES.

Specification forming part of Letters Patent No. 218,793, dated August 19, 1879; application filed July 17, 1879.

*To all whom it may concern:*

Be it known that I, LEWIS STRAYER, of York, in the county of York and State of Pennsylvania, have invented a new and Improved Millstone-Dress; and I hereby declare the following to be a full, clear, and exact description thereof, reference being had to the accompanying drawings, making part of this specification, in which—

Figure 1:
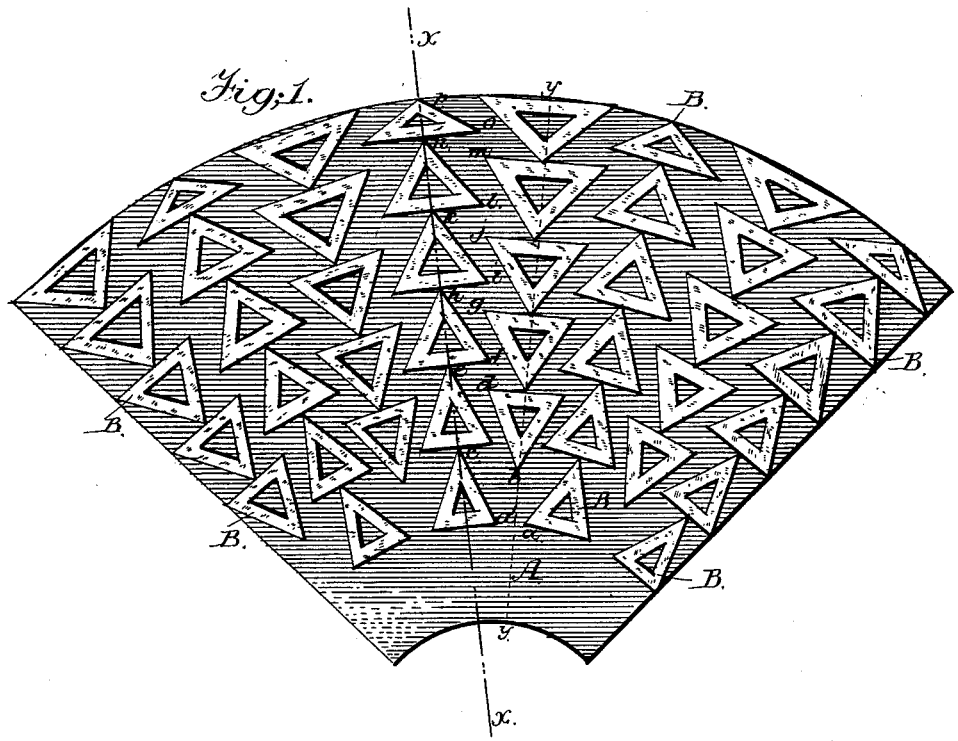
Figure 2:

Figure 1 shows a plan of the face of a portion of the burr. Fig. 2 is a sectional view on the line $x$ $x$ of Fig. 1.

The object of my invention is to provide a burr-dress whereby I am enabled to more fully and completely disintegrate the grain and check it sufficiently in its passage from the center to the circumference of the burr.

My invention consists in a burr having its face provided with triangular-shaped teeth, arranged in rows on lines radial to the center of the stone, the rows alternately having the bases of the triangles and the peaks of the triangles toward the center of the burr, and each alternate tooth in the circumferential arrangement varying in its distance from the center of the burr.

In order that those skilled in the art may make and use my invention, I will proceed to describe the manner in which I have carried it out.

In the said drawings, A is the body of the burr, made of any desired diameter or thickness, and having on its face a series of triangular-shaped teeth, B B, raised about the eighth of an inch above the plane of the face of the burr, and arranged in series on radial lines from the center to the circumference of the burr. Each alternate tooth in concentric circles lies in the same circumferential plane. One line of the teeth, radiating from the center, has the bases of the triangles lying toward the center, and the next line has the peaks toward the center, so that the teeth lie reversed alternately in their concentric arrangement, the point of one tooth being slightly out of the plane of the next tooth.

The effect of this arrangement is to produce a peculiarly-shaped zigzag passage for the grain from the center to the circumference of the burr, by which the grain is checked and eddied and brought in contact with the grinding-surfaces continuously, so as to produce a thorough disintegration of the grain.

When the grain enters the center of the burr, for instance, it is caught by the point $a$ of one of the teeth and thrown toward $a'$, which, in turn, throws it toward $b$, and thence it is thrown into angle $c$, where it is detained or checked and eddies around, meantime getting numerous abrasions. Then the grain works into the diagonal passage and out to $e$ $d$, when the same check and disintegration take place, and so on until it passes out of the burr.

This series of alternate inclined and right-angular passages produce a good and thorough grinding of the grain.

Having thus described my invention, what I claim as new, and desire to secure by Letters Patent, is—

A millstone-dress consisting of the raised triangular teeth B, arranged in radial lines, and each alternate line having their bases and their peaks toward the circumference of the burr, and alternately varying in the plane of their circumferential arrangement, substantially as set forth.

In testimony whereof I hereunto set my hand and seal this 9th day of July, A. D. 1879.

LEWIS STRAYER. [L. S.]

Witnesses:
R. K. EVANS,
W. F. MORSELL.